United States Patent [11] 3,625,550

[72] Inventor Edouard Beyeler
 Chemin de la Preville 10, 1510 Moudon,
 Switzerland
[21] Appl. No. 872,930
[22] Filed Oct. 31, 1969
[45] Patented Dec. 7, 1971

[54] UNION JOINT FOR TUBING
 7 Claims, 1 Drawing Fig.

[52] U.S. Cl. ..................................................... 285/99,
 285/110, 285/353, 277/169
[51] Int. Cl. ...................................................... F16l 17/00
[50] Field of Search........................................... 285/111,
 110, 353, 65, 70, 71, 72, 73, 74, 75, 76, 77, 78, 79,
 320, 99, 352; 277/169, 168

[56] References Cited
 UNITED STATES PATENTS
 704,792 7/1902 Gold............................. 285/74
 2,774,617 12/1956 Lanninger..................... 285/111 X 3,193,311 7/1965 Gordan........................... 285/70
 3,427,053 2/1969 Dunlap et al................... 285/70 X
 FOREIGN PATENTS
 453,908 12/1927 Germany....................... 285/112
 894,641 10/1953 Germany....................... 285/320
 391,140 4/1933 Great Britain................. 285/353

Primary Examiner—Thomas F. Callaghan
Attorneys—Robert E. Burns and Emmanuel J. Lobato ABSTRACT: A union joint for two tubes has an annular packing member for each tube end and threadably engageable union parts fitted around the packing members for tightening the joint. The packing members each have an inwardly directed lip which extends beyond the tube end prior to tightening and an internal annular slit converging towards the tube end. Metal rings in each slit have rubber-covered flat portions extending in front of each tube end. When tightened, the lips are pressed against one another and are located adjacent the flat portions of the rings.

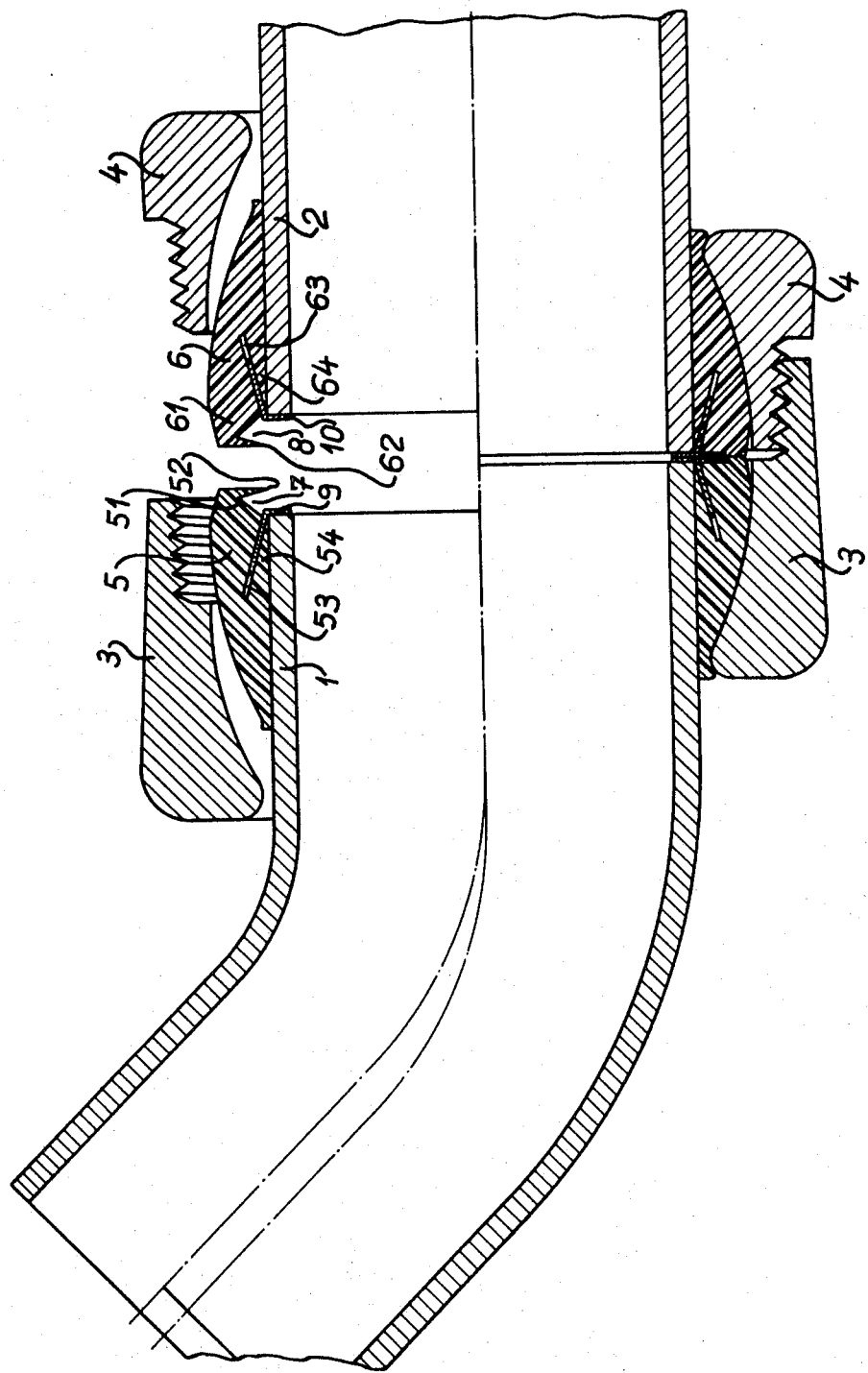

UNION JOINT FOR TUBING

This invention relates to the fluidtight joining of two tubes. The word "tube" is herein used to cover all types of tubing and piping.

According to the invention, there is provided device for the fluidtight joining of two tubes comprising two annular packing members each fittable around a tube end, two annular parts engageable on said packing member and adapted to cooperate with one another to enable tightening of the joint, said packing members each being provided on their end adjacent their tube end with an inwardly directed lip which extends beyond the tube end prior to tightening of said annular parts, and said packing members each having an internal annular slit converging towards their end adjacent their tube end, so that tightening of said annular parts ensures an axial and radial compression of said packing members against one another and against said tubes.

The accompanying drawing shows, by way of example, an embodiment of the invention.

The single FIGURE of the drawing is a vertical cross section of the joining device, the upper part of the drawing illustrating the two ends of the tube apart, while the lower part illustrates the two ends joined together.

The joint between tubes 1 and 2 is ensured by two rings 3 and 4 which are provided with screw threads to enable screwing together, as shown in the lower part of the drawing.

The union is made watertight by two annular parts 5 and 6 around each of the tube ends to be joined. A section of the joint shown as pieces 51 and 61, respectively, projects over the ends of the tubes. These projecting pieces are so shaped as to make a circular lip 52 and 62, respectively, extending towards the center and leaving annular cavities 7 and 8, respectively.

The parts of the joint are also provided with annular slits 53 and 63, respectively, cut obliquely to the axis of the tube, these slits defining a substantially horizontal annular lip 54 and 64 respectively.

The thickness of the parts 5 and 6 of the joint tapers off towards the extremities opposed to the joining edges. A frustoconical skirt of a metal ring 9 fits into the groove 53, the other end of the skirt protruding so that it can be pressed on the end of the tube 1. An identical metal ring 10 fits into part 6. The protruding parts of these rings 9 and 10 are preferably covered with rubber by vulcanization.

When the tubes 1 and 2 are placed end to end, and the two rings 3 and 4 and the ends 51 and 61 are respectively put together, lips 52 and 62 are pressed one against the other. In the same way, the flat protruding parts of rings 9 and 10 come together. The tightening up of the rings 3 and 4 also ensures a radial compression of the lips 54 and 64 against the tubing. Subsequently, the watertightness is ensured axially by the lips 54 and 64 and, radially, by lips 52 and 62, the cavities 7 and 8 ensuring a pressure of lips 52 and 62 one against the other in the case of overpressure inside the tubing.

The positioning rings 9 and 10 and their supple coverings contribute on the one hand to ensuring watertightness and, on the other hand, provide a slight axial dilation of the tubing. However, it is quite possible to use uncovered rings, thereby enabling, for example, an electric contact between the tubes.

It should be noted that in the embodiment as illustrated, when closed the rings 3 and 4 do not come in contact with the tubes and there is thus no risk of damaging or deforming them.

Parts 5 and 6 can be made of various materials, for example, rubber, a synthetic material or even a metal, as for example steel. The union device and the compression can be provided by other devices than screw threads; for example, by a notched or bayonet joint.

It should also be noted that the joint components can be utilized without the rings 9 and 10.

What is claimed is:

1. A joint for two plain end tubes comprising two like annular packings one on each tube end, each of said packings being tapered with an inner cylindrical surface fitting the tube and an outer approximately conical surface with the thicker end of the packing at the end of the tube, the thicker end of each said packing being formed with an annular lip extending radially inwardly from the outer peripheral portion of said packing and defining an annular recess between said lip and an end face of said packing, and an annular slit extending axially inwardly and radially outwardly from an inner peripheral portion of said thicker end of said packing, and two pressure rings surrounding said packings respectively and having inner surfaces conforming respectively to the outer surfaces of said packings and means for drawing said pressure rings together to confine said packings and press said thicker ends of said packings with said annular lips together and thereby provide a fluidtight seal.

2. A joint according to claim 1, in which a thin annular metal skirt assembled with each said packing has a conical portion received in said slit and a radial portion extending in over the end of the tube.

3. A joint according to claim 2, in which said radial portion of each said skirt is coated with an elastic resilient material.

4. A joint according to claim 1, which the outer surface of each said packing as viewed in axial section is convexly curved.

5. A joint according to claim 1, in which one of said pressure rings has an internally threaded end portion and the other of said pressure rings has a mating externally threaded end portion.

6. A joint according to claim 1, in which said packings are of rubber.

7. A joint according to claim 1, in which said packings are of synthetic material.

* * * * *